June 26, 1923.
B. A. MITCHELL
DIFFERENTIAL VIBRATOR
Filed July 26, 1921
1,459,847
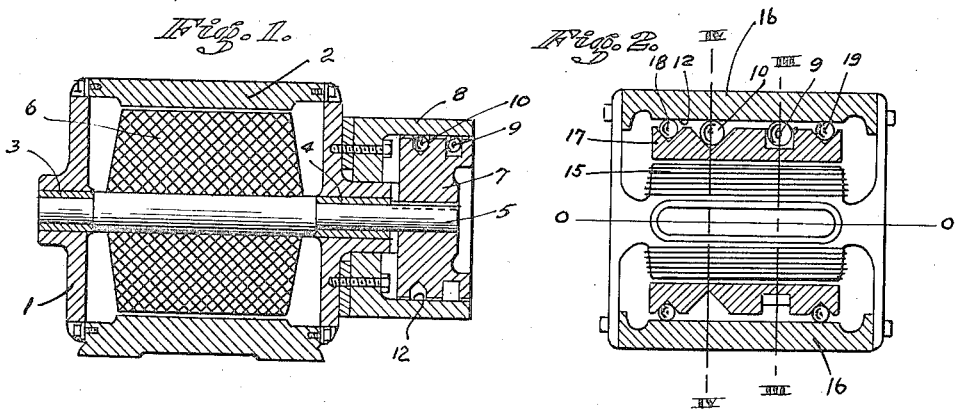
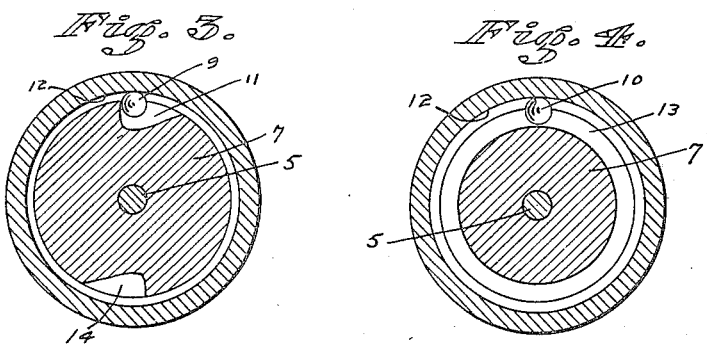
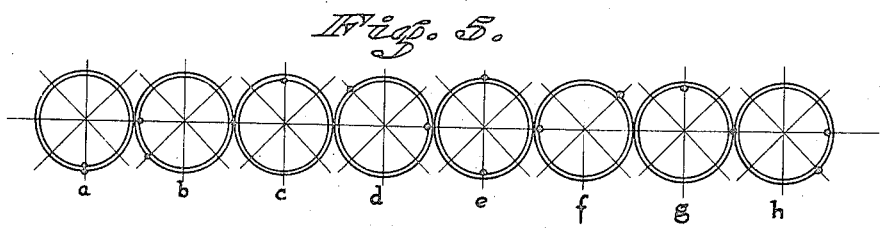
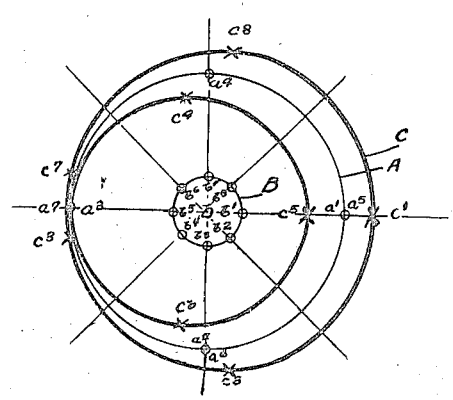
Inventor
Benjamin A. Mitchell
By Miller, Henry & Boykin
Attorneys.

Patented June 26, 1923.

1,459,847

UNITED STATES PATENT OFFICE.

BENJAMIN A. MITCHELL, OF GARFIELD, UTAH.

DIFFERENTIAL VIBRATOR.

Application filed July 26, 1921. Serial No. 487,818.

*To all whom it may concern:*

Be it known that I, BENJAMIN A. MITCHELL, a citizen of the United States, and a resident of Garfield, county of Salt Lake, State of Utah, have invented a new and useful Improvement in Differential Vibrators, of which the following is a specification.

My invention has for its object mechanism for producing a vibratory motion without imposing the strains of relative vibration between the frame and the rotor or rotating mass. Other objects will appear from the specification and drawings.

These objects I attain by mounting a rotating mass in running balance in a frame or casing, and employing the said rotor to drive two weights independently mounted and free to move radially and at different angular speeds, whereby the algebraic sums of the centrifugal forces of the said weights is a resultant force setting up a vibration in the entire mechanism.

Attention is directed to my copending applications, No. 275,321, filed February 6, 1919, and No. 413,844, filed September 30, 1920, and my copending application, No. 487,819 filed July 26, 1921.

By referring to the accompanying drawings, wherein is shown one embodiment of my invention, the construction and operation will be made clear.

Figure 1 represents a motor having attached thereto my differential vibrator, all in section.

Fig. 2 is an alternate construction wherein the vibrator is embodied in the motor construction, partly in section.

Fig. 3 is a cross section of Fig. 2 on the line III—III.

Fig. 4 is a cross section of Fig. 2 on the line IV—IV.

Fig. 5 is a diagrammatic showing of the two weight masses illustrated in Figs. 3 and 4 in their consecutive positions of rotor revolutions.

Fig. 6 is a graphic showing of the resultant vibrating force throughout two revolutions of the rotor.

Throughout the figures similar parts are represented by similar numerals.

Referring first to Figure 1, the rotor frame work or casing is shown by the numeral 1, having a field 2, armature 6, bearings 3, 4, and shaft 5, on one end of which is fixed a rotor 7, and a relatively stationary circular frame 8 adapted to enclose the periphery of the said rotor. The inner surface of the frame is turned to form a smooth surface 12 over which the balls 9 and 10 are adapted to travel. The ball 9 sets in a pocket 11 of the rotor 7, and is therefore forced to travel in its path on the surface 12, at the same speed as the rotor 7. The ball 10 is mounted in an annular groove 13, so that during the revolution of the rotor 7 the ball 10 rolls between the surface 12 and that of the race 13 in 7, and therefore makes one revolution about the center of the shaft 5, while the rotor 7 is making two revolutions thereabout. The rotor 7 is constructed in running balance and to facilitate this, a second pocket 14 may be milled out at 180 degrees from 11, thus making the mass of the rotor 7 symmetrical about the axis 5. It will now be seen that when the motor is driven there are no vibrating strains between the shaft 5 and the bearings 3 and 4. However the rotation of the balls 9 and 10 about the axis 5 will result in the development of centrifugal forces, whose resultant expends itself in a displacement of the entire element 8 and frame 1 carrying the rotating balls. In other words, the entire mechanism is put in vibration by the centrifugal forces developed by the rotation of the balls 9 and 10.

In Fig. 5 the successive positions of the balls 9 and 10 during two revolutions of the rotor are indicated in diagrams $a$, $b$, $c$, $d$, $e$, $f$, $g$, $h$, the ball 9 being indicated on the inner circles and ball 10 on the outer circles. Starting with the balls together at the lower side of diagram successive positions of the ball 9 are indicated 90° apart in the successive diagrams and in each instance the corresponding position of ball 10 is shown.

In the graphic representation of Fig. 6 the ball 9 is represented in successive positions upon the large circle A, while ball 10 is represented in the small concentric circle B. Assuming the balls start out together as indicated at position $a'$, $b'$, when the rotor has completed an angular movement of 90° the balls 9 and 10 will occupy the relative positions indicated at points $a^2$, $b^2$, respectively; at an angular displacement of 180° they will be as shown at $a^3$, $b^3$; at 270° they will be as shown at $a^4$, $b^4$; at 360° they are indicated at $a^5$, $b^5$, this being at the end of one complete revolution of the rotor; at an angular displacement of 450° the balls 9 and 10 will be positioned respectively as indicated at points $a^6$, $b^6$; at 540° as shown at $a^7$, $b^7$ and at 630° as shown at $a^8$, $b^8$. The next additional movement of 90° brings the balls together again in the initial position indicated at $a^1$, $b^1$, the rotor and ball 9 having at this time completed two revolutions, while the ball 10 has made but a single revolution around the axis of the rotor. The several positions from points $a^1$, $b^1$, to $a^8$, $b^8$ of Fig. 6 and 90° beyond the point $a^8$ to the initial positions $a^1$, $b^1$, therefore represent consecutive positions of the masses 9 and 10 at intervals of 90° of the rotor position throughout two revolutions of the shaft 5. The radii of circles A and B are selected as proportional to the centrifugal forces of the balls 9 and 10 respectively.

Assuming the masses of the balls 9 and 10 to be equal, we will have in the initial position $a^1$, $b^1$, the centrifugal force of the two masses acting cumulatively and of combined magnitude proportional to vector $p$ $c^5$. At the position $a^2$, $b^2$ the ball $a^9$ will be acting in a radial direction disposed 45° from that of ball 10, and at each successive position of the two balls indicated on the diagram there will be an increased angular displacement of 45° between the centrifugal action of the two balls until the first revolution of the rotor is completed when the ball 9 occupies the position $a^5$ and ball 10 the position $b^5$. When this condition is reached it will be seen that the centrifugal actions of the two balls are acting in direct opposition and the vibratory effect of this centrifugal action will be at a minimum, and proportional to vector $p$ $c^5$. As the rotor continues on its second revolution the ball 9 continues to increase its angular lead of ball 10 until at the end of the second revolution the balls are again together at the initial position $a^1$, $b^1$, the ball 9 having at this time made two complete revolutions with the rotor while the ball 10 has made a single revolution. At the initial point $a^1$, $b^1$ the combined centrifugal action of the two balls acting radially will be at a maximum and consequently the tendency to displacement from the axis 5 will be at a maximum. At the end of one complete revolution of the rotor when the ball 9 has completed one revolution and ball 10 one-half revolution, the combined centrifugal force of the two masses acting radially will be at a minimum and the tendency to displacement also at a minimum. We therefore have a vibration period equal to the number of revolutions of shaft 5 divided by two. The curve C of Fig. 6 represents this combined centrifugal force at any instant. For convenience in constructing this curve radii of the circles $a$ and $b$ are constructed approximately proportional to the centrifugal force of the respective masses 9 and 10. In the cases assumed, where the masses 9 and 10 are equal, the centrifugal force of mass 9 will be approximately four times that of mass 10 due to the relative speeds of rotation. However, if the mass of ball 10 be made equal to four times that of ball 9, it will be evident that the centrifugal action of the balls will be equal and at the end of one revolution when the balls assume the position indicated at points $a^5$, $b^5$ the centrifugal forces of the two masses will counteract each other, the resultant being equal to zero. The curve representing the resultant of the centrifugal action of the two balls would then be correspondingly modified so that point $c^5$ would lie at the zero point represented at $p$ and the inner loop thereof would then be eliminated.

In Fig. 2 is shown an alternate form of my vibrator, wherein a stator is shown at 15, a circular casing or frame having a ball rolling and sliding surface is shown at 16, the rotor is indicated at 17, and ball bearings of the well known type are shown at 18—19. These bearings consist of ball races with a plurality of balls and of any conventional design and serve as rotor bearings and which enable the rotor 17 to rotate freely about the stator 15 and axis $o$, $o$. The rotor 17 is provided with weights or balls 9—10, 9 being in a pocket and 10 being in a ball race. The stator 15 is provided with windings adapted to be energized by electricity, whereby the rotor 17 is caused to rotate, forcing with it and at the same speed the ball 9 and causing the ball 10 to rotate between the surface 12 and the rotor 17, and therefore at one half the speed of rotation of the rotor 17. In this way the cycle of vibrating force indicated in Figs. 5 and 6 is produced about the axis $o$, $o$, as a resultant of the centrifugal forces of the weight masses.

Under conditions of different diameters of surface 12 and rotor 17, and ball 10, ball 10 may rotate at speeds less than ball 9 but not necessarily at one half the speed of rotation of ball 9; and I desire to be understood as claiming all such variations.

I claim:

1. In a vibrator, a frame and a rotor adapted to rotate with respect to said frame and in running balance, a mass radially disposed and adapted to rotate at less than the speed of the rotor, a second mass driven at the speed of the rotor, both of said masses driven by but free from fixture with said rotor.

2. In a vibrator, including in combination a frame, a rotor mounted to rotate with respect to said frame in running balance, and a plurality of independent masses interposed between the rotor and the frame and rotatable at different speeds to impart periodic vibration to said frame.

3. A vibrator comprising a stationary frame carrying a rotor mounted to rotate in running balance, said frame having a cylindrical surface adjacent said rotor, a ball or balls adapted to roll between said rotor and said surface, a second ball or balls carried in a pocket in said rotor and adapted to be driven in rolling and sliding contact with said surface, and means for driving the rotor.

4. A vibrator comprising a stationary frame carrying a rotor mounted to rotate in running balance, said frame having a cylindrical surface adjacent said rotor, a ball or balls adapted to roll between said rotor and said surface, a second ball or balls carried in a pocket in said rotor and adapted to be driven in rolling and sliding contact with said surface, and electric motor means to drive said rotor.

5. A vibrator as set forth in claim 4 wherein the rotor and frame are provided with electric motor windings adapted to be electrically energized to rotate the rotor.

6. A vibrator, including in combination, a stationary frame carrying a rotor mounted to rotate in running balance, said frame having a cylindrical surface adjacent said rotor, a plurality of masses confined between said rotor and said surface, and means for rotating said masses at different speeds.

7. A vibrator, including in combination, a stationary frame carrying a rotor mounted to rotate in running balance said frame having a cylindrical surface adjacent said rotor, a plurality of masses confined between said rotor and said surface, means for rotating one of said masses at the same speed as said rotor and means for rotating said other mass at a different speed.

8. A vibrator, including in combination, a stationary frame carrying a rotor mounted to rotate in running balance, a plurality of masses confined by said frame and rotor, and means for driving said masses for effecting vibration of said casing.

9. A vibrator, including in combination, a stationary frame carrying a rotor mounted to rotate in running balance, a plurality of masses confined by said frame and rotor, means for driving said masses to effect a vibration, the period of which is different from the period of rotation of said rotor.

BENJAMIN A. MITCHELL.